United States Patent Office 3,343,035
Patented Sept. 19, 1967

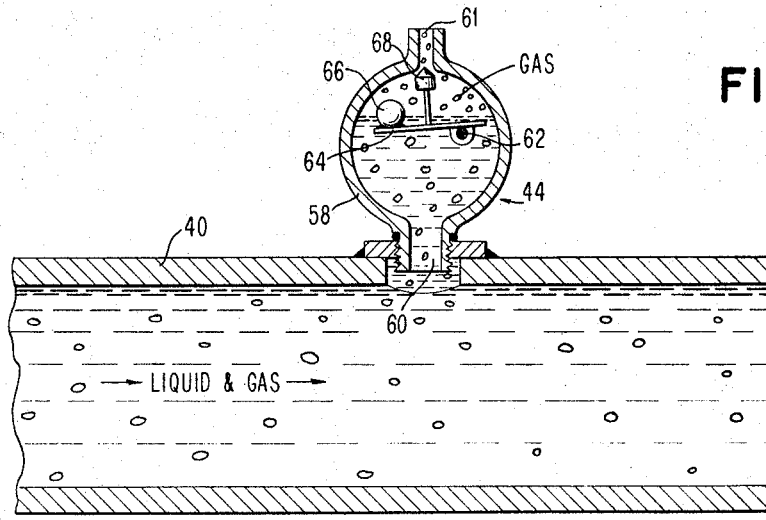
FIG.2
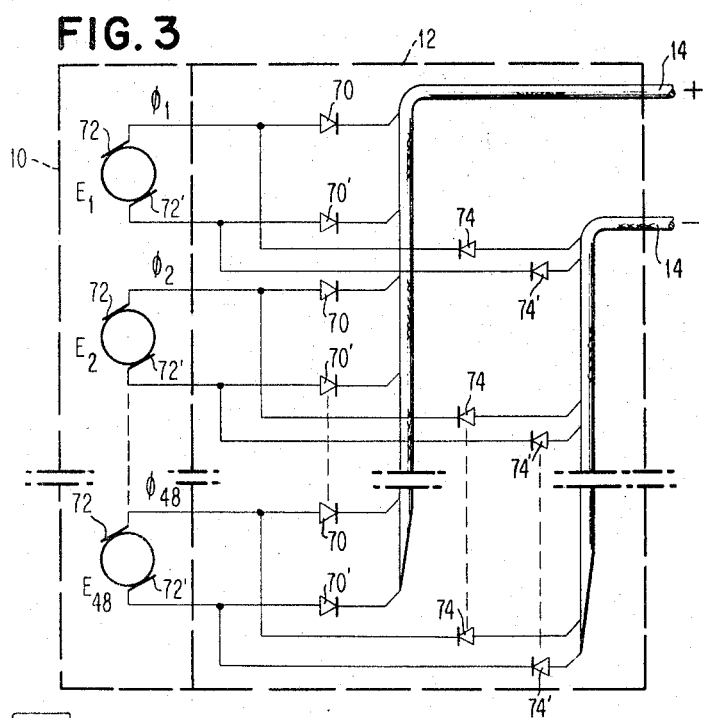
FIG.3
FIG.4
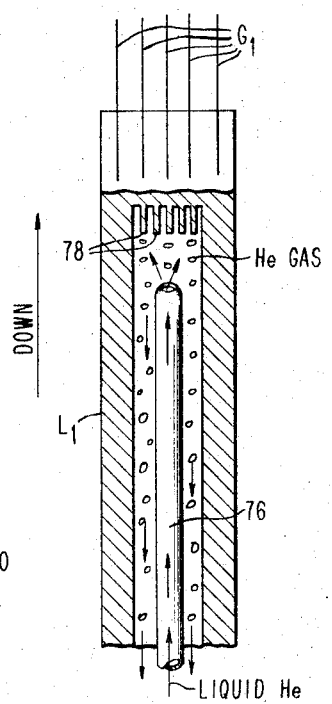
FIG.4a
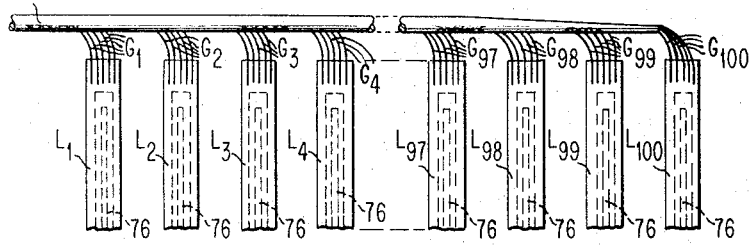

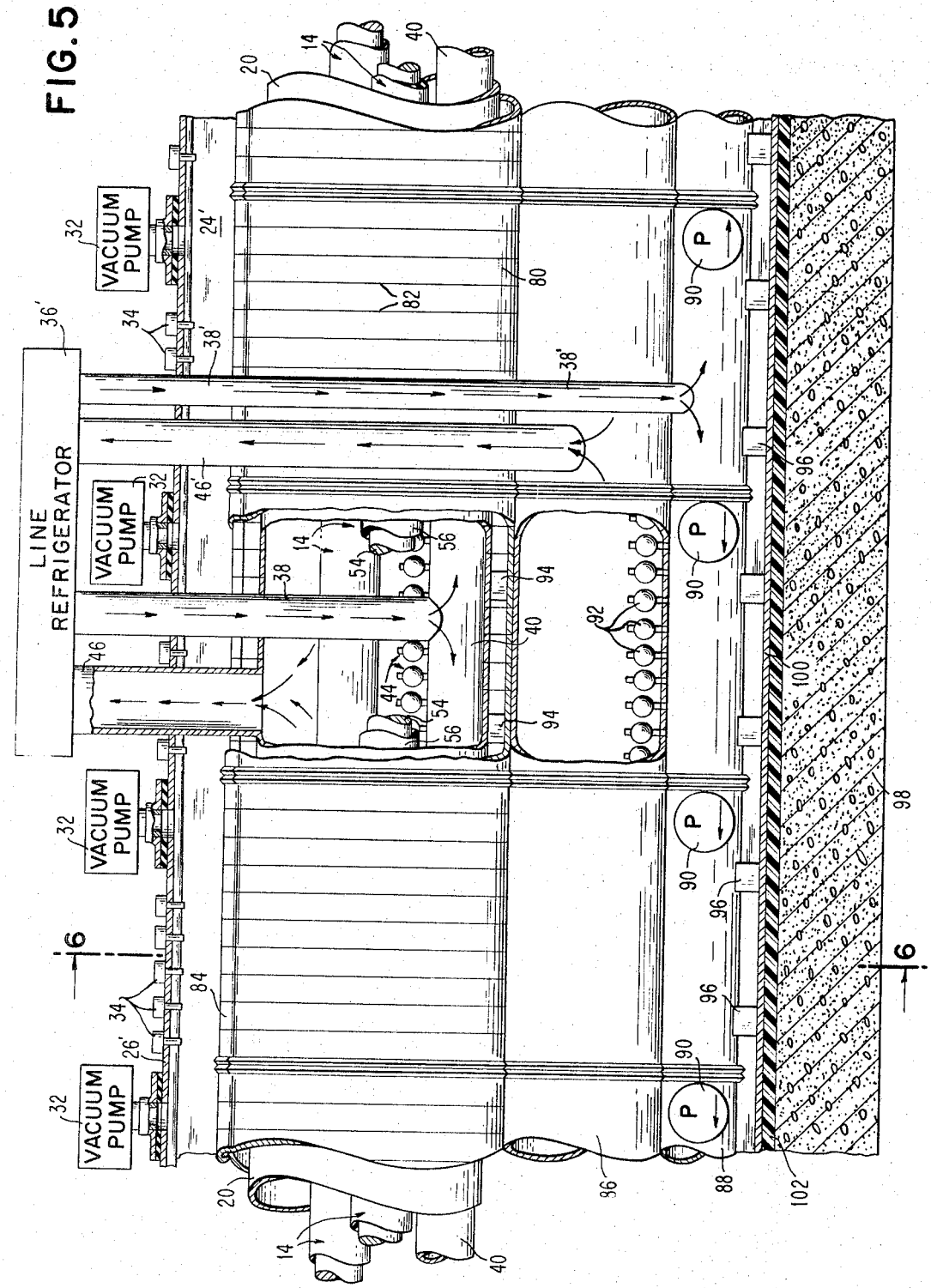

3,343,035
SUPERCONDUCTING ELECTRICAL POWER TRANSMISSION SYSTEMS
Richard L. Garwin, Scarsdale, N.Y., assignor to International Business Machines Corporation, New York, N.Y., a corporation of New York
Filed Mar. 8, 1963, Ser. No. 263,987
11 Claims. (Cl. 317—13)

This invention relates to electrical power transmission systems for transmitting energy over very long distances and more particularly to electrical power transmission systems which utilize superconducting lines as the power transmission medium between an electrical power generating source and utilization means remote therefrom.

At present the cost of transmission of electric power makes it uneconomical to transmit electrical power over very long distances. The maximum distance over which large amounts of power is presently transmitted is derived as a compromise between the loss of power in transmission lines or conductors having a relatively small cross-sectional area and the capital expense of a large-diameter transmission line or conductor.

To produce the necessary energy for present day power transmission systems, coal is shipped in many instances from the mine to the power plant at a considerable expense. This expense would be saved by generating the electrical power in the vicinity of the mine and transmitting it to remote highly-populated locations where the energy is to be utilized. However, it has been found to be more economical to ship the coal from the mine to remotely-located power plants relatively near the vicinity of utilization of the electrical energy than to bear the expense of the construction of present-day type transmission systems and the losses inherent therein.

Attempts have been made to provide a super-high-voltage transmission system utilizing ordinary metallic conductors operating at 750 kilovolts. This system is subject to radio interference from corona and the right-of-way for the installation of this system is very expensive since the necessary towers for supporting the lines of this system are tall and massive as well as unsightly. To provide such a super-high-voltage transmission system capable of carrying 100 billion watts 1000 kilometers, a. current of 140,000 amperes is required assuming 5% dissipation thereof in the lines. This system requires two aluminum lines or conductors each having a cross-sectional area of approximately 2400 square centimeters weighing a total of approximately 1,200,000 tons of aluminum. Of course, in addition to the initial very high cost of construction of this system, it exacts a 5% toll on the transported electrical energy at a loss having a present-day total value of billions of dollars per year.

It is an object of this invention to provide an improved electrical power transmission system.

Another object of this inevntion is to provide a more economical power transmission system.

Yet a further object of this invention is to provide a long-lines power transmission system which can be installed at a lower cost than the present day systems.

Yet another object of this invention is to provide a power transmission system which is considerably more efficient in operation than present day transmission systems.

Still a further object of this invention is to provide an electrical power transmission system having a pair of superconductor wires carrying very many billions of watts of electrical energy, for example, one-half the installed electrical power in the United States.

Still another object of this invention is to provide an electrical power transmission system for transmitting billions of watts of electrical energy which may be contained in a relatively small ditch in the earth near the surface thereof.

In accordance with the present invention an electrical power transmission system is provided which includes long lines or conductors passing through a loop containing cryogenic fluids suitable for lowering the temperature of the lines of conductors to superconducting temperatures.

An important advantage of this invention is that an electrical power transmission system is provided which is more economical in maintenance and in use than are present day power transmission systems.

An important feature of the electrical power transmission system of the persent invention is that every portion of a long super-conducting loop or conductor may be maintained in a resistanceless condition by employing a refrigeration loop having a liquefier or refrigerator at only one point along the loop.

The foregoing and other objects, features and advantages of the invention will be apparent from the following more particular description of preferred embodiments of the invention, as illustrated in the accompanying drawings.

In the drawings:

FIG. 2 illustrates a type of gas-liquid separator which may be used in the embodiment illustrated in FIGURE 1.

FIG. 3 illustrates a power source and rectification circuit which may be used at the input end of the transmission line shown in FIG. 1.

FIG. 4 shows terminal connections of one of the superconducting lines of the transmission system shown in FIG. 1.

FIG. 4a illustrates in more detail one of the terminal connections shown in FIG. 4.

FIG. 5 shows another embodiment of the electrical power transmission line of the present invention.

Figure 7:
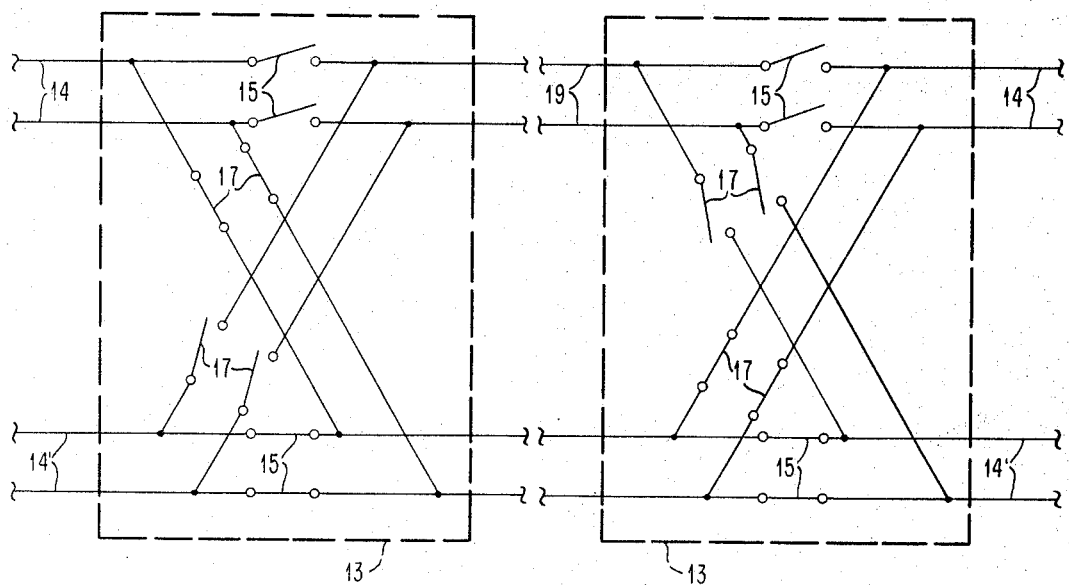
Figure 8:
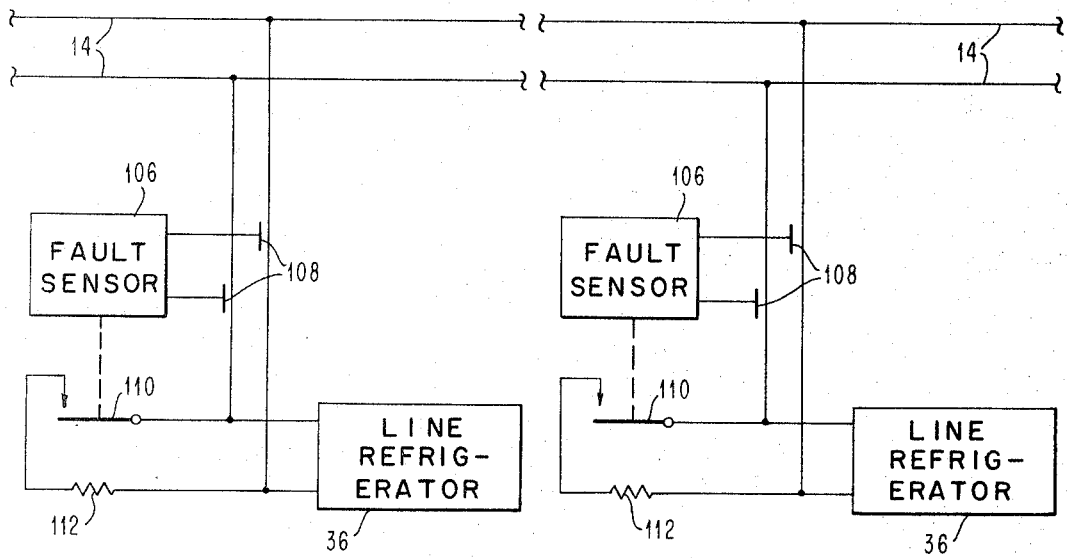

FIG. 7 indicates two pairs of interconnected superconducting lines which may be used in the power transmission system of the present invention and, FIG. 8 illustrates a circuit for draining off energy stored in the superconducting line for use during the occurrence of a fault in the line.

Figure 1:
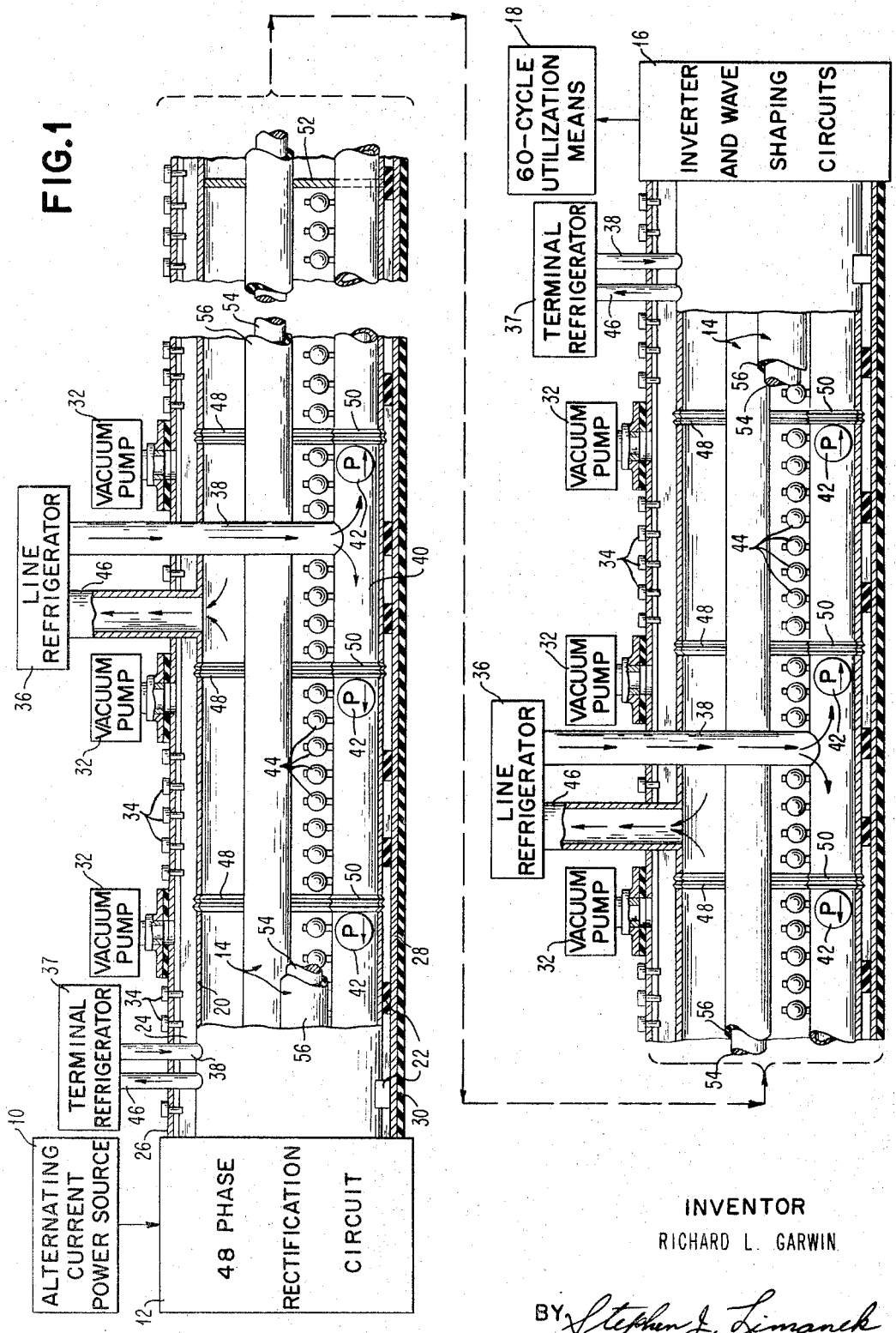
FIG. 1 shows one embodiment of the electrical power transmission line of the present invention.

Referring to the drawings in more detail wherein like reference numerals refer to similar elements, there is shown in FIG. 1 an electrical power transmission of the present invention which includes an alternating-current source 10 coupled to a 48-phase rectification circuit 12 providing an input to a pair of superconductor lines 14, each of which need not have a cross-sectional area greater than 10 square centimeters. The output end of the pair of superconductor lines 14 is connected to inverter and wave shaping circuits 16 to which is coupled 60-cycle utilization means 18.

The pair of superconductor lines 14, each of which are preferably twisted or wound in helical fashion so as to eliminate differential expansion problems, are contained within a copper shell or tube 20, preferably 6 to 8 inches in diameter, which is supported by a plurality of spaced polyethylene or other plastic type blocks 22. The lines 14 may be inserted loosely in the shell 20 or they may be supported or secured occasionally or continuously therein. The shell 20 is disposed within a vacuum-tight enclosure 24 incidated by a top plate or cover 26 and a bottom plate 28 resting in a thermal insulation member indicated at 30. The enclosure 24 is evacuated by a plurality of vacuum pumps 32 disposed above the top plate 26 at spaced points, for example, 500 meters apart and communicating with the enclosure 24 through appropriate openings in the top plate 26. In order to provide a hard vacuum, of approximately $10^{-6}$ millimeters of mercury, throughout the enclosure 24, a plurality of ion pumps 34 are also disposed on the top plate 26 so as to communicate with the enclosure 24 through additional appropriate openings in the top plate 26. To maintain the pair of superconductor lines 14 at superconducting temperatures, a plurality of known refrigerators or liquefiers 36 and 37 are provided for introducing cryogenic liquid, for example, liquid helium, into the shell 20, the refrigerator 36 being used along the transmission lines at intervals of, for example, 20 kilometers, and the refrigerators 37 being used at the terminals of the lines. The cryogenic liquid is introduced into the shell 20 from the refrigerators 36 through an output line 38 which feeds the liquid to a distribution or supply line 40, which may have a diameter of about 1.5 inches, disposed within the shell 20 and soldered thereto with its axis parallel to the axis of the shell 20. A plurality of circulating pumps 42 are coupled to the distribution line 40 at points spaced apart by, for example, a distance of 500 meters, so as to move the liquid through the distribution line 40 in opposite directions from the point of entry into the distribution line 40 without exceeding the critical pressure of the liquid contained therein. Each of these pumps 42 may be a 50 watt-one liter per second pump. Mounted at spaced apart points, for example, 50 meters apart, on the upper portion of the distribution line 40 are a plurality of gas-liquid or vapor-liquid separators 44 which provides means for permitting the gas forming in the cryogenic liquid distribution line 40 to escape into the portions or channel of the shell 20, acting as a gas return line, in which the superconductor lines 14 are disposed. The escaped gas returns to the refrigerators 36 where it is liquefied through input lines 46 connecting the interior of the shell 20 to the refrigerators 36. A plurality of bellows 48 and 50, each about one meter long, are inserted at spaced apart points, for example, at 500 meters intervals, within the shell 20 and the liquid helium line 40, respectively, so as to prevent undue stresses in the system when cooled to superconducting temperatures which causes about ½% shrinkage. The shell 20 is further provided with one or more walls 52 located approximately midway between refrigerators 36 so as to isolate one refrigerator system including distribution lines from the other refrigerator systems.

Each of the pairs of superconductor lines 14 may include a stranded or solid superconductor wire 54, made of, for example, niobium-tin or niobium-zirconium, surrounded by an insulating sheath 56. If desired, the superconductor wires 54 may be synthetic alloys made in accordance with the teachings in commonly assigned copending U.S. patent application Ser. No. 559,659, filed on May 26, 1966, which is a continuation of application Ser. No. 222,396, filed on September 10, 1962, and now abandoned by Garwin, Nowick and Seraphim, entitled "Superconductivity." These superconductor wires are capable of carrying very high currents, i.e., current densities greater than $10^5$ amperes per centimeter, in high magnetic fields, which may be stronger than $10^5$ oersteds, without losing their superconductivity.

In FIG. 2 of the drawing there is shown in more detail a gas-liquid separator which may be used as one of the gas-liquid separators 44 shown in FIG. 1 of the drawing. The gas-liquid separator 44 shown in FIG. 2 includes a substantially spherical container 58 having at the lower end thereof an inlet 60 communicating with the interior of the liquid supply line 40 and an outlet 62 communicating with the gas return channel portion of the shell 20 shown in FIG. 1 of the drawing. Within the chamber 58 is a pivot member 62 to which is connected a rigid arm 64. A float 66 is secured to the arm 64 at a point spaced from the pivot member 62. A stopper 68 is secured to the arm 64 at a point intermediate the pivot member 62 and the float 66. The stopper 68 is arranged so that when the float 66 is raised to a predetermined level, the stopper 68 is inserted into the outlet 61 of the chamber 58 to prevent gas from passing through the outlet 61 into the gas return channel portion of the shell 20.

An alternating current source and a 48-phase rectification circuit which may be used for the alternating current power source 10 and the 48-phase rectification circuit 12 is illustrated somewhat in detail in FIG. 3 of the drawing. The alternating current power source 10 includes a plurality of alternating current generators indicated at $E_1, E_2, \ldots$ and $E_{48}$ for providing voltages of phase $\phi_1$, phase $\phi_2, \ldots$ and phase $\phi_{48}$, respectively, each generator providing one or more alternating current voltages differing in phase from each of the other generators by a multiple of 7½°. The 48-phase rectification circuit 12 includes first and second diodes 70 and 70' connected in a given polarity to first and second terminals 72 and 72', respectively, of each of the alternating current generators $E_1, E_2, \ldots$ and $E_{48}$ for applying voltages to one of the lines of said pair of superconductor lines 14 and third and fourth diodes 74 and 74' connected in a polarity opposite to said given polarity to the first and second terminals 72 and 72', respectively, of each of the alternating current generators $E_1, E_2, \ldots$ and $E_{48}$ for applying voltages to one of the lines of said pair of superconductor lines 14.

In FIG. 4 of the drawing there is shown an arrangement for terminating the superconductor lines 14 and connecting them to apparatus which is at ambient or room temperature without destroying superconductivity in the lines 14. Each of the lines 14 may have at the end thereof a number of strands. The strands of the wire are divided into a number of groups, for example, 100 groups indicated by the reference characters $G_1, G_2, \ldots G_{100}$. Each of the groups $G_1$ to $G_{100}$ is then connected, for example, by soldering, to a separate conductor of a corresponding number of hollow conductors indicated by the reference characters $L_1$ to $L_{100}$, the hollow conductors being connected to the inverter and wave-shaping circuits 16 of FI. 1 of the drawing. Each of the conductors $L_1$ to $L_{100}$ has a bore extending longitudinally through a substantial length thereof into which a tube 76 is inserted for supplying a cryogenic liquid, such as, liquid helium, to the interior of the hollow conductor at the end thereof to which the strands $G_1$ to $G_{100}$ are connected. The tube 76 is connected to the output line 38 of one of the terminal refrigerators 37.

In FIG. 4a there is shown a more detailed view, partly in cross section, of one of the hollow conductors, i.e., conductor $L_1$ and a group of strands $G_1$ connected thereto. In FIG. 4a it can be seen that the cryogenic liquid tube 76 has an opening at the lower end thereof through which the cryogenic liquid is discharged into the bore of the conductor $L_1$ at the end thereof at which the group of strands $G_1$ is connected. Since extremely high current is carried in the pair of superconductor lines 14 a very high current passes through the group of strands $G_1$ into the conductor $L_1$ producing at the points of juncture of the strands $G_1$ and the conductor $L_1$ a considerable amount of heat, which, along with conducted heat through the conductor $L_1$ from room temperature circuitry, if not adequately dissipated, will raise the temperature of the superconductor lines 14 above the critical temperature to thus destroy the superconductivity of the wires 54. In order to increase the cooling surfaces in conductor $L_1$, and thus to evaporate more rapidly the cyrogenic liquid which is being discharged from the end of the tube 76 to more readily maintain the desired low temperature, a plurality of fins 78 are provided in the hollow conductor $L_1$, which fins may be preferably made as an integral part of conductor $L_1$.

In the operation of the superconductor power transmission system of the present invention, the mechanical vacuum pumps 32 are operated to produce a vacuum in the enclosure 24 in which the superconductor transmission lines 14 are located. In order to provide a hard vacuum in enclosure 24, the ion pumps 34 distributed along the system are set into operation. When the desired vacuum is produced in the enclosure 24 the line refrigerators 36 and the terminal refrigerators 37 are operated to introduce the desired cryogenic liquid into the distribution line 40 through the refrigerator output lines 38. The cyrogenic liquid is moved along through the distribution lines 40 by the plurality of pumps 42 in the direction indicated by the arrows on the pumps 42. As the cryogenic liquid flows through the distribution line 40, gas bubbles formed therein, escape from the cryogenic liquid into the gas-liquid separators 44. Since the float 60 which controls the position of the arm 64 follows the cryogenic liquid level in the gas-liquid separator 44, the stopper 68 which is arranged to plug up the outlet 61 of the gas-liquid separator 44 when the liquid level is above a predetermined level becomes unseated when suffcient gas collects above the liquid level in the gas-liquid separator 44 to force the liquid level below the predetermined level. With the stopper 68 unseated the gas escapes through the outlet 61 into the gas return channel portion of the shell 20, which acts as a return manifold collecting the gas for return to the line refrigerator 36 through the input line 46. The liquid level in the gas-liquid separator 44 rises with the escape of the gas and the stopper 68 again plugs up the outlet 61. Since there are a large number of independently operated gas-liquid separators 44 distributed along the distribution line 40, it can be seen that a substantially continuous flow of cryogenic gas passes through the refrigerator input lines 46 to the line refrigerators 36. The cryogenic system is preferably designed so that each line refrigerator 36 supplies cryogenic liquid along the system for a distance of 10 kilometers, i.e., to a barrier 52, located in each direction from the line refrigerator 36. The gas-liquid separators 44 are arranged so that a substantially equal amount of cryogenic gas escapes into the shell 20 for each linear unit thereof. The separators 44 reduce very greatly the dissipation due to increased mass velocity in the supply line 40, which the low-density vapor would require if allowed to accumulate in the liquid supply line 40. The distributed pumping provided by the circulating pumps 42 in the supply line 40 is used to avoid exceeding the critical pressure of the cryogenic liquid in the line 40.

In order to cool the terminals of each of the transmission lines 14, the terminal generators 37 are operated to supply the cryogenic liquid to the tubes 76 in the hollow conductors $L_1$ to $L_{100}$ shown in FIGS. 4 and 4a of the drawing. The liquid introduced into the hollow conductors $L_1$ to $L_{100}$ is evaporated at the end thereof at which the group of strands are connected to form a cryogenic gas which returns to the terminal refrigerator 37 through the bore of the hollow conductors $L_1$ to $L_{100}$ without the tube 76 through the input line 46 of the terminal refrigerator 37. It should be understood that the terminal arrangement illustrated in FIGS. 4 and 4a of the drawing may be used at the power source terminal of the system as well as at the power utilization end of the system.

After the temperature within the shell 20 has been reduced to the desired superconducting temperature, which, as is known, is dependent upon the material of the wire 54 of the pair of superconductor lines 14, the alternating current power source 10 is energized. Each of the 48 alternating current generators $E_1$ to $E_{48}$ of the power source 10 produces an alternating current which has a phase differing from each of the other alternating current generators $E_1$ to $E_{48}$ by a multiple of 7½°. The alternating current voltage produced by the generators $E_1$ to $E_{48}$ is converted into a direct current voltage before it is applied to the pair of superconductor lines 14 by the 48-phase rectification circuit 12. The positive portion of the alternating current voltage at terminal 72 of the generators $E_1$ to $E_{48}$ is applied to one of the pair of superconductor lines 14 through the diode or rectifier 70 and the negative portion of the alternating current voltage at the terminal 72 is applied to the other line of the pair of superconductor lines 14 through the diode or rectifier 74. The alternating current voltage at the other terminal 72' of each of the generators $E_1$ to $E_{48}$ has its positive portion applied to the one line of the pair of superconductor lines 14 through the diode or rectifier 70' and its negative portion applied through the diode or rectifier 74' to the other line of the pair of superconductor lines 14. The amount of current flowing through the pair of superconductor lines 14 will of course depend upon the load coupled to the superconductor lines 14. However, when a voltage of 100,000 volts is applied to the pair of superconductor lines 14 from the power source 10, the system will readily carry a current of hundreds of thousands of amperes. Since a large number of electrical utilization devices operate by 60 cycle per second electrical energy, the direct current flowing through the pair of superconductor lines 14 is converted from direct current to 60 cycles alternating current by appropriate inverter and wave shaping circuits 16 which may be of a conventional type but which must be capable of handling the large currents flowing through the hollow conductor $L_1$ to $L_{100}$ thereto.

Figure 6:
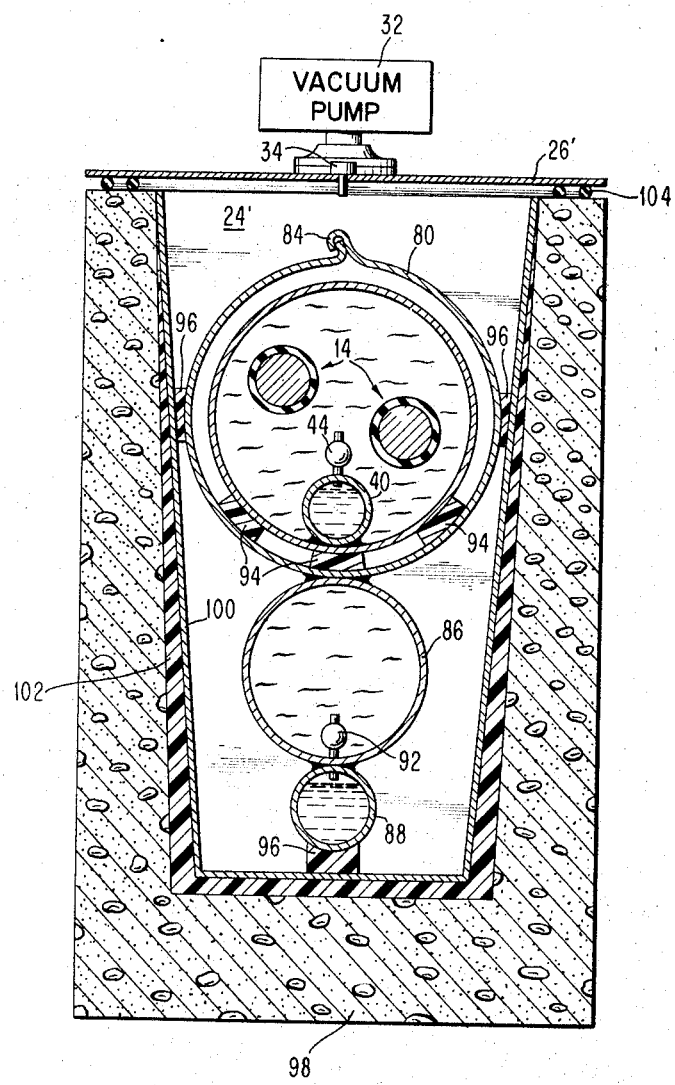
FIG. 6 illustrates a transverse cross-sectional view of the transmission line shown in FIG. 5 taken along line 6—6.

In FIGS. 5 and 6 there is illustrated another embodiment of the invention wherein the cryogenic temperature is produced by employing a two-step refrigeration process. This embodiment employs substantially the same apparatus which has been described in connection with the system illustrated in FIGS. 1, 2, 3, 4 and 4a of the drawing and additionally a radiation shield 80 surrounding the shell 20 and maintained at a temperature intermediate between the temperature within the shell 20 and the ambient temperature. The shield 80 contains a number of slits 82 which may be located at intervals of, for example, 10 feet, so as to permit the evacuation of the area between the shield 80 and the shell 20 by the vacuum and ion pumps 32 and 34. There is provided at the upper portion of the shield 80 a seam 84 which can be readily unhooked for installation and inspection purposes. The lower portion of the shield 80 is mechanically connected to a gas line or return manifold 86 by any suitable means such as by soldering and the lower portion of the gas line 86 is also suitably mechanically connected to a cryogenic liquid supply line 88, which may have a diameter of about 2 inches, as indicated more clearly in FIG. 6 of the drawing. A first cryogenic liquid, for example, nitrogen, is supplied to the cryogenic liquid line 88 through an output line 38' from a line refrigerator 36' which is also arranged to provide a second cryogenic liquid, for example, helium, to the distribution line 40 through the output line 38. A plurality of circulating pumps 90 are coupled to the cryogenic liquid line 88 to move the cryogenic liquid from the output line 38' through the cryogenic liquid line 88 in the directions indicated by the arrows on the pumps 90. A second plurality of gas-liquid separators 92 spaced apart by, for example, 50 meters, are provided within the gas line 88 at the lower portion thereof, so as to communicate with the liquid nitrogen flowing through the liquid line 88. Each of these gas-liquid separators should be capable of handling an evaporation rate of approximately 3 cubic centimeters of liquid per second or approximately 30 cubic centimeters per second of gas under normal operating conditions and may be of the type illustrated in FIG. 2 of the drawing. The pressure in the gas line 88 is maintained preferably at about 10 atmospheres.

The shell 20 is supported within the shield 80 by a first plurality of plastic support blocks 94 and the shield 80, the gas line 86 and the cryogenic liquid line 88 are supported by a second plurality of plastic support blocks 96 within an enclosure 24' formed by a concrete trough 98 having an outside width of, for example, 12 inches, into which is inserted an aluminum or steel liner 100 glued to the concrete trough 98 by an epoxy resin 102.

A cover plate 26' is disposed at the top of the concrete trough 98 with gaskets 104, for example, rubber rods, employed to form a vacuum-tight seal therebetween. The cover plate 26' which is preferably made of aluminum has a plurality of apertures therein through which the pumps 32 and 34 communicate with the enclosure 24'.

In the operation of the embodiment of the invention illustrated in FIGS. 5 and 6 of the drawing, the vacuum and ion pumps 32 and 34 are operated to provide a hard vacuum in the enclosure 24' in a manner similar to that described hereinabove in connection with the operation of the embodiment illustrated in FIGS. 1, 2, 3, 4 and 4a of the drawing. After the hard vacuum is obtained, the line refrigerators 36' are operated so as to supply the nitrogen liquid to the cryogenic liquid line 88. The nitrogen liquid, which boils at 77° K., passes through the output line 38' to the cryogenic liquid line 88 where it is moved through the line 88 by the circulating pumps 90. A nitrogen gas forms in the line 88, it floats toward the gas-liquid separators 92 which ultimately discharge this gas into the gas line 86 for delivery to the refrigerator input line 46' to become liquefied in the line refrigerator 36' before being recirculated through the cryogenic liquid line 88. While the nitrogen liquid is being recirculated through the cryogenic liquid line 88, the helium liquid which boils at a much lower temperature than does liquid nitrogen, i.e., at 4.2 K., is recirculated through the distribution line 40 in the manner described hereinabove in connection with the operation of the first embodiment of this invention. Accordingly, it can be seen that the nitrogen liquid is used to lower the temperature of the radiation shield 80 surrounding the shell 20 to approximately 77° K. by thermal conduction through the solder connections between the shield 80 and the gas line 86, the gas line 86 and the solder connections between the gas line 86 and the cryogenic liquid line 88. Since the liquid nitrogen lowers the temperature in the enclosure 24' to 77° K., the liquid helium need lower the temperature only from 77° K. to approximately 4° K. Thus by providing the radiation shield 80, the work load of the helium system is considerably reduced the installed refrigeration capacity for helium in each of the line refrigerator 36' being about 0.25 megawatts and the capacity for nitrogen being about 1.6 megawatts.

The system illustrated in FIGS. 5 and 6 of the drawing is capable of transmitting at least 100 billion watts of electrical power, i.e., $10^5$ volts and $10^6$ amperes, for a distance of at least 1000 kilometers over a single pair of superconducting wires each of which has a cross-sectional area no greater than 10 square centimeters at an annual savings of billions of dollars compared to power transmission costs for an equal amount of energy over the same distance, by conventional or known transmissions systems. The efficiency of the system of the present invention is about 99% based on power transmitted less power drawn off to run refrigeration equipment, all divided by the transmitter power. It should be understood that the refrigerators 36 and 37 and the pumps 32, 34, 42 and 90 are all operated by electrical energy which is tapped from the superconductor lines 14, for example, at each refrigerator location and then converted, if desired, to an alternating current voltage. Wire coupled to such a tap in the line may be strung along the system to operate many of the pumps.

Another important advantage of the transmission system of the present invention is that ionic mobilities are essentially zero at about 4° K., so that insulation problem relating to the superconductor wires 14 which have a potential difference of 100,000 volts is much less severe than is the insulation problem in normal transmission lines at this potential.

The systems of the present invention have been described as direct current transmission systems. It would be convenient to transmit alternating current voltages, for example, at 60 cycles per second, for ease in many instances in tapping and utilizing the power. However, the inductive impedance of the line and the description due to eddy currents or vibration and anelastic losses make the use of alternating current in the transmission line 14 uneconomical. If some losses can be tolerated in the line 14, low frequency, i.e., about 60 cycles per second, alternating current voltage may be used particularly when the superconductor wire 56 is finely divided as is the wire described in the above mentioned copending U.S. patent application.

It should be pointed out that by using the above described systems of this invention several hours and even days are required to reduce the temperature of the superconductor wires 54 from earth surface temperature to the superconducting temperature of the wire. If a more rapid cool-down is desired, the flow of the cryogenic fluids may be modified somewhat so as to permit liquid to pass through the liquid supply lines 40 and 88 into the wire-carrying channel of shell 20 and into the nitrogen gas line 86, respectively, by, for example, providing gas-liquid separators which include additional floats, switches and motors permitting, upon demand, the liquid as well as the gas to pass therethrough.

Although liquid helium and liquid nitrogen have been mentioned hereinabove as coolants which may be used in the transmission system of this invention, it should be noted that for short distances, i.e., distances substantially less than 1000 kilometers, supercooled nitrogen or helium may be suitably employed.

In order to reduce the possibility of a prolonged interruption of the flow of electrical power to the utilization means 16 illustrated in FIG. 1 of the drawing, a second transmission line 14', shown in FIG. 7 of the drawing, similar to the first transmission line 14 is installed parallel to and provided with frequent permanent interconnections with the first line 14. With the two lines 14 and 14' permanently interconnected so that either or both lines are carrying the electrical energy, a number of breakdowns or faults may occur on the two lines 14, 14' without an interruption in service at the utilization means 16 provided sufficient interconnections, for example, at 60 kilometer intervals, are made between the lines. The interconnections between the two lines 14 and 14' are shown in FIG. 7 of the drawings as switching sections 13, each of which has a pair of line switches 15 serially connected in each of the two lines 14 and 14' and a pair of cross switches 17 connected from one side of each of the pair of line switches 15 to the opposite side of the other pair of line switches 15. These switches 15 and 17 are preferably in the form of soldered joints. When a defective line section, such as that indicated as section 19 of line 14 is to be repaired, current is removed from the lines 14 and 14' at the power source 10, for example, by employing a temporary water load during shut-down requiring the boiling away of approximately 100 tons of water per second, heating electrically prepared switches or joints 15, 17 so that they may be unsoldered to isolate the section 19. It can be seen that service through switching sections 13 can be continued while section 19 of line 14 is isolated by opening line switches 15 of line 14 and cross switches 17 as shown in FIG. 7 of the drawing. The switching sections 13 are normally maintained in large vacuum chambers at the superconducting temperatures.

The characteristic impedance of the line 14 may be, for example, approximately 100 ohms, whereas the resistance of the load 18 connected to it is very small, for example, approximately 0.1 ohm. Under these conditions the line 14 contains a rather large amount of energy $$W = p\tau \frac{Z_0}{R}$$

where $\tau$ is the length of the line in seconds, approximately $5 \times 10^{-3}$, $p$ is the power delivered, approximately $10^{11}$ watts, and $Z_0$ and $R$ are the characteristic impedance of the line 14 and the resistance of the load 18. Thus, W is approximately $5 \times 10^{11}$ joules, and it requires approximately 5 seconds either to bring the line 14 to full current or to have the current decay if the input is shorted to ground. Evidently, too, it requires approximately 5 seconds for the current to build to its maximum value in a shunt fault, and the energy dissipated in such a fault can be reduced below W/n by switching n resistors of magnitude $Z_0/2$ across the line when the fault is detected. The number of resistors n may be 50 and the resistors may be co-located with the refrigerators 36.

There is shown in FIG. 8, adjacent to two of the refrigerators 36 a fault sensor or pulse responsive device 106 which by capacitive coupling to taps on the transmission line 14 detects the steep wavefront, at least equal to 20 kilovolts, due to a shunt fault and by mechanical or better by explosive-squib-operated switches 110 connects a local 50 ohm approximately 5-ton cast-iron resistor 112 across the line 14.

Accordingly, it can be seen that the present invention provides a system having a lossless superconductor transmission line which can be used in any part of the world to satisfy needs for electrical power from nuclear reactors, solar plants or natural energy sources located far from populated centers.

While the invention has been particularly shown and described with reference to preferred embodiments thereof, it will be understood by those skilled in the art that various changes in form and details may be made therein without departing from the spirit and scope of the invention.

I claim:

1. An electrical power transmission system comprising:
    (a) two mutually parallel channels;
    (b) a superconductor wire being superconductive at a given temperature disposed in one of said channels; and
    (c) means for passing a cryogenic fluid through said one channel in one direction at a temperature at least as low as said given temperature and through the other of said channels in the opposite direction to maintain said wire at its superconductive temperature;
    (d) said superconductor wire including an end thereof having a plurality of strands and further including,
    (e) a plurality of hollow conductors containing a cryogenic fluid coupled to said strands.

2. An electrical power transmission system comprising:
    (a) first and second mutually parallel channels,
    (b) a superconductor wire which is superconductive at a given temperature disposed in said first channel,
    (c) a refrigerator,
    (d) said refrigerator having an output line at which the refrigerator delivers a cryogenic fluid in liquid form at a temperature at or below said given temperature;
    (e) said refrigerator having an input line for receiving cryogenic fluid in gaseous form to be reliquified by said refrigerator;
    (f) means connecting the input line of said refrigerator to said second channel for supplying said second channel with said cryogenic fluid in liquid form;
    (g) a plurality of gas-liquid separators mounted at spaced points along said channels and connecting said first and second channels at said points for conveying from said second channel to said first channel cryogenic fluid which evaporates from a liquid to a gas in said second channel; and
    (h) means connecting said first channel to said input line for said refrigerator for feeding said gas into said refrigerator to be reliquified.

3. The transmission system of claim 2 wherein said second channel is mounted within said first channel.

4. The transmission system of claim 3 wherein said first channel is a shell and said second channel is a tube mounted within said shell.

5. The transmission system of claim 4 wherein vacuum means are connected to said first channel for evacuating said first channel.

6. The transmission system of claim 2 wherein said system includes third and fourth channels for circulating a cryogenic fluid which is at a temperature which is higher than the temperature of said cryogenic fluid in said first and second channels.

7. A transmission system as set forth in claim 2 further including:
    (a) a second superconductor wire and,
    (b) a plurality of switching sections interconnecting said wires at a plurality of spaced apart points along said wires.

8. A transmission system as set forth in claim 2 further comprising a protective circuit including a fault sensor coupled to said superconductor wire and a series circuit including a switch and a resistor coupled to a point on said line for dissipating electrical energy contained in said line in response to the output of said fault sensor.

9. A transmission system as set forth in claim 8 further including a plurality of said protective circuits coupled at intervals to said wire, said wire having a given characteristic impedance and each of said resistors having a resistance value equal to one half of said characteristic impedance.

10. An electrical power transmission system including:
    (a) first and second parallel channels;
    (b) a superconductor wire which is superconductive at a given temperature disposed in said first channel;
    (c) current supply means connected to said superconductor wire at one end of said transmission line;
    (d) current receiving means connected to said wire at the other end of said transmission line;
    (e) at least one line refrigerator connected along said transmission line;
    (f) said line refrigerator having an output line to which the refrigerator delivers a cryogenic fluid in liquid form at a temperature at or below said given temperature;
    (g) said refrigerator having an input line for receiving cryogenic fluid in gaseous form to be reliquified by said refrigerator;
    (h) means connecting said output line of said refrigerator to said second channel for supplying said second channel on both sides of said refrigerator in said line with cryogenic fluid in liquid form;
    (i) a plurality of gas-liquid separators mounted at spaced points along said channels and connecting said first and second channels at each of these points for conveying from said second channel to said first channel cryogenic fluid which evaporates from a liquid to a gas in said second channel;
    (j) and means connecting said first channel on both sides of said line refrigerator to said input line for said refrigerator for feeding the cryogenic fluid in gaseous form from said channel into said refrigerator to be reliquified.

11. The transmission system of claim 10 wherein said superconductor wire includes:
    (a) an end thereof having a plurality of strands and further including,
    (b) a plurality of hollow conductors containing a cryogenic fluid connected to said strands.

References Cited

UNITED STATES PATENTS

| 650,987 | 6/1900 | Ostergren | 174—15 |
|---|---|---|---|
| 3,102,740 | 9/1963 | Plummer | 174—15 |
| 3,162,716 | 12/1964 | Silver | 174—15 |

FOREIGN PATENTS 209,041  4/1909  Germany.

LARAMIE E. ASKIN, *Primary Examiner.*

J. F. RUGGIERO, H. HUBERFELD,
*Assistant Examiners.*